United States Patent [19]
Hirakawa

[11] Patent Number: 4,747,676
[45] Date of Patent: May 31, 1988

[54] WIDE-ANGLE SEVEN-ELEMENT LENS SYSTEM

[75] Inventor: Jun Hirakawa, Tokyo, Japan

[73] Assignee: Asashi Kogaku Kogyo Kabushiki Kaisha, Tokyo, Japan

[21] Appl. No.: 45,990

[22] Filed: May 4, 1987

[30] Foreign Application Priority Data
May 2, 1986 [JP] Japan .................... 51-102779

[51] Int. Cl.$^4$ .................... G02B 13/04; G02B 9/64
[52] U.S. Cl. .................... 350/460; 350/458
[58] Field of Search .................... 350/458, 459, 460

[56] References Cited
U.S. PATENT DOCUMENTS
4,046,459  9/1977  Kawamura .................... 350/460
4,143,945  3/1979  Kubota .................... 350/460

Primary Examiner—John K. Corbin
Assistant Examiner—Scott J. Sugarman
Attorney, Agent, or Firm—Sughrue, Mion, Zinn, Macpeak, and Seas

[57] ABSTRACT

A wide-angle lens system of the seven-unit-seven-element configuration. Arranged in ordered from the object side are two opposed negative meniscus lenses, two opposed positive lenses, a negative lens and two lens with opposed convex surfaces. Four required and one optional numerical conditions are imposed on the focal length, radius of curvature, Abbe numbers and refractive indices.

9 Claims, 10 Drawing Sheets

WIDE-ANGLE SEVEN-ELEMENT LENS SYSTEM

BACKGROUND OF THE INVENTION

1. Field of the Invention

The present invention relates to a photographic wide-angle lens system. More particularly, the present invention relates to a wide-angle lens system that has an aperture ratio of 1:2.8 and a half viewing angle of the order of 30 degrees and which accomplishes effective compensation for aberrations when used with a single-reflex lens camera featuring an intermediate film size of 6×4.5 cm or 6×7 cm.

BACKGROUND OF THE INVENTION

A number of lens systems that feature an aperture ratio of 1:2.8 and half viewing angles of the order of 30 degrees have been developed for use in 35-mm cameras as lenses having focal lengths of the order of 35 mm. Because of their comparatively small focal lengths, these lenses experience correspondingly small amounts of aberrations. However, if the focal lengths of these lenses are simply increased in order for them to be used in single-reflex cameras featuring an intermediate film size, they will experience aberrations which are 1.4-2 times as large.

A lens system whose lens configuration is similar to that of the present invention is proposed in Japanese Patent Publication No. 60606/1982. The second lens element of this prior art system is formed of an optical material that has a large enough Abbe number to reduce the occurrence of chromatic aberration in that lens element. However, in the absence of deliberate provisions for achieving color correction, this system is incapable of satisfactory compensation for off-axis chromatic aberration. In addition, the compensation for other aberrations occurring in this system is also unsatisfactory.

Japanese Patent Publication No. 1588/1970 discloses a lens system that features half viewing angles of the order of 30 degrees and which yet achieves sufficient aberrational compensation to be usable with single-reflex cameras featuring an intermediate film size. However, this lens system is dark (F number=f/4.5) and is not capable of satisfactory compensation for curvature of field and off-axis chromatic aberration.

SUMMARY OF THE INVENTION

An object, therefore, of the present invention is to provide a wide-angle lens system that features an aperture ratio of 1:2.8 and a half viewing angle ($\omega$) of the order of 30 degrees and which yet achieves compensation for aberrations satisfactorily enough to produce a focused image on a large-sized film.

The invention can be summarized as a wide-angle lens system of the seven-unit-seven-element configuration. Very briefly, the configuration comprises, in order from the object side, two oppositely facing negative meniscus lenses, two oppositely facing positive lenses, a negative lens, and two lenses with oppositely facing convex surfaces. There are five required numerical conditions and a preferable sixth condition on focal lengths, radius of curvature, Abbe numbers and refractive indices.

BRIEF DESCRIPTION OF THE DRAWINGS

FIGS. 2A, 4A etc. refer to the case where the object is at infinity; FIGS. 2B, 4B etc. to the case where an image magnification of 1/20 is attained in the absence of any compensation for the near-distance variation; and FIGS. 2C, 4C etc. to the case where an image magnification of 1/20 is attained when compensation for the near-distance variation is effected by reducing the aerial distance between the fourth and fifth lens elements.

DETAILED DESCRIPTION OF THE PREFERRED EMBODIMENTS

Figure 1:
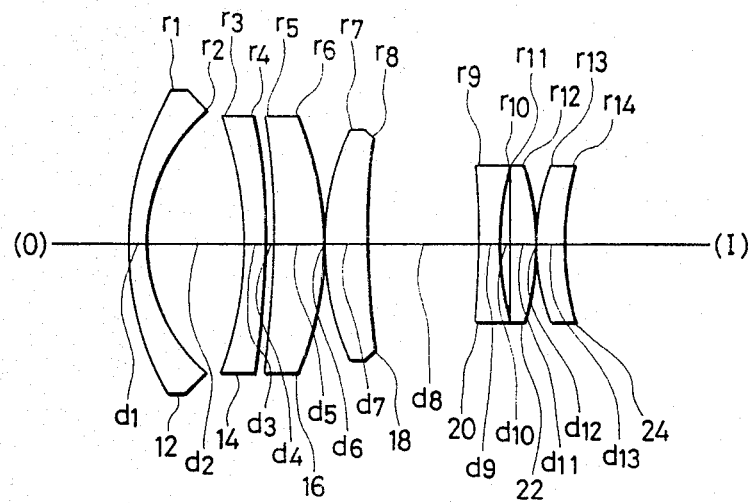
FIGS. 1, 3, 5, 7 and 9 are simplified cross-sectional views of the lens systems fabricated in accordance with Example 1 to 5, respectively.

This object of the present invention can be attained by a wide-angle lens system of the seven-unit-seven-element configuration. This configuration for five embodiments is illustrated respectively in FIGS. 1, 3, 5, 7 and 9. The seven lens elements are arranged from the object side O in the following order. A first lens element 12 is a negative meniscus lens having a convex surface $r_1$ directed toward the object O. A second lens element 14 is a negative meniscus lens having a convex surface $r_4$ directed toward the image I. A third lens element 16 is a positive lens having a strong convex surface $r_6$ directed toward the image I. A fourth lens element 18 is a positive lens having a strong convex surface $r_7$ directed toward the object O. A fifth lens element 20 is a negative lens. A sixth lens element 22 has a strong convex surface $r_{12}$ directed toward the image I. A seventh lens element 24 is a meniscus lens having a convex surface $r_{13}$ directed toward the object O.

Additionally, this lens system satisfies the following conditions:

(1) $-1.6 < f_1/f < -1.2$
(2) $-1.1 < r_3/f < -0.65$
(3) $\nu_1 > 40$
(4) $\nu_2 > 40$
(5) $n_3, n_4 > 1.65$ where f is the focal length of the overall system; $f_1$ is the focal length of the first lens element 12; $r_3$ is the radius of curvature of the surface of the second lens element 14 which is on the object side; $\nu_1$ and $\nu_2$ denote the Abbe numbers of the first and second lens elements 12 and 14, respectively; and $n_3$ and $n_4$ denote the refractive indices, at the d-line, of the third and fourth lens elements 16 and 18, respectively.

The conditions (1) to (5) which should be satisfied by the wide-angle lens system of the present invention are described hereinafter in detail.

Condition (1) relates to the power of the first lens element 12 and is necessary to attain a certain minimum amount of back focus and to achieve a size reduction of the overall system. This condition sets forth the range over which wide-angle viewing can be achieved. If the lower limit of condition (1) is not reached by the negative power of the first lens element, an outward coma will develop and wide-angle viewing cannot be realized. There is a further disadvantage resulting from an insufficient back focus. If the negative power of the first lens element exceeds the upper limit of condition (1), an inward coma will develop in the second lens surface $r_2$.

Condition (2) relates to the lens surface $r_3$ of the second lens element 14 which is on the object side. Those off-axis rays passing through the first lens element 12 at its marginal portion will experience more chromatic aberration than those passing through the near-central portion. In order to attain a balance between the chromatic aberration occurring in the marginal portion of the lens element and that developing in its central portion, the aerial distance from the point where off-axis rays leave the first lens 12 to the point where it encounters the second lens 14 is made to differ between the marginal and the central portions. Stated more specifically, the first and second lens elements 12 and 14 are disposed in such a manner that the concave second surface $r_2$ of the first lens 12 will face the concave first surface $r_3$ of the second lens 14 and the radius of curvature of the latter surface $r_3$ is rendered actually negative such that those rays which leave the marginal portion of the first lens 12 will encounter the second lens 14 before the chromatic aberration that has occurred in that portion will excessively spread. Also, those rays which leave the near-central portion of the first lens 12 will encounter the second lens 14 after the chromatic aberration that has occurred in that portion has been allowed to spread to some extent. In this way, a balance can be attained between the chromatic aberration occurring in the marginal portion of the second lens 14 and that developing in its central portion. The limit at which the desired balance can be attained is indicated by the lower limit of condition (2). If the lower limit of condition (2) is not reached, insufficient balance is achieved with respect to color correction of off-axis rays. If the upper limit of condition (2) is exceeded, higher-order coma aberrations will develop.

Condition (3) sets forth the requirement that should be met by the dispersion index of the first lens element 12. It is advisable that the first lens element be made of an optical material with a large Abbe number which will develop only a small amount of chromatic aberration so that the rear lens units will not have to carry undue loads for compensation of chromatic aberration. If the Abbe number of the first lens 12 is equal to or smaller than 40, a desired balanced compensation for lateral (transverse) chromatic aberration will not be attainable in the range of intermediate to maximum viewing angles.

Condition (4) sets forth the dispersion index of the second lens element 14. The second lens element 14 is preferably made of an optical material with a small Abbe number so that effective compensation for lateral chromatic aberration can be achieved in the range intermediate to maximum viewing angles. If the Abbe number of the second lens element is equal to or larger than 40, a desired balance cannot be attained between intermediate and maximum viewing angles in regard to compensation for lateral chromatic aberration.

The prior art system proposed in Japanese Patent Publication No. 60606/1982 uses a second lens element having an Abbe number of 60.8. Since this lens is not intended to achieve compensation for chromatic aberration, the prior art system is unable to accomplish effective compensation for chromatic aberrations resulting from off-axis rays, nor is it capable of achieving balanced compensation for such aberrations at intermediate and maximum viewing angles.

Condition (5) sets forth the requirements that should be met by the refractive indices of both the third and fourth lens elements 16 and 18. These lenses have a strong positive power and govern the overall power of the system. Therefore, by forming these lenses 16 and 18 of an optical material with a high refractive index, the resulting Petzval sum and field curvature can be reduced to low levels. If the refractive index of each of the third and fourth lens elements 16 and 18 is equal to or smaller than 1.65, the resulting Petzval sum is large enough to produce an image plane that bends toward the object. In addition, for smaller refractive indices the curvature of each lens would need to be increased in order to attain a given power but then this would lead to the occurrence of spherical and coma aberrations.

As for the dispersion indices of the optical materials of the third and fourth lens elements 16 and 18, a glass having a large Abbe number in the range of 49 to 56 is selected as the optical material of the third lens element 16 in the lens systems shown in Examples 1 to 5 to be described later in this specification. Furthermore, a glass having a small Abbe number in the range of 30 to 41 is selected as the optical material of the fourth lens element 18. By using these glasses, a balanced compensation for chromatic aberrations can be attained at intermediate and maximum viewing angles.

The intended lens system of the present invention can be attained by satisfying the conditions (1) to (5) and even better results are obtained if it has the following additional feature. Namely, high efficiency of aberrational compensation is retained for a close object by reducing the aerial distance between the fourth and fifth lens elements. The lens system of the present invention is of the retrofocus type so that if the object is at a close distance, a negative spherical aberration will occur on the axis while a positive curvature of field will develop at point off-axis. In order to correct this field curvature occurring in a positive direction on account of the phenomenon which is generally referred to as a "near-distance variation", a field curvature is desirably produced in a negative direction by reducing the aerial distance $d_8$ between the fourth and fifth lens element 18 and 20 through which off-axis rays will travel at an angle with respect to the optical axis. That is, the distance $d_8$ is reduced as the object more closely approaches the lens system.

It is more advantageous for the purposes of the present invention that the lens system additionally satisfies the following condition:

(6) $0.75 < f_{1-4}/f < 1.25$ where $f_{1-4}$ is the composite focal length of the first to fourth lens elements 12, 14, 16 and 18.

Condition (6) sets forth the requirement that should be met in order to compensate for the spherical aberration that occurs on account of the "near-distance variation". According to this condition, when the aerial distance between the fourth and fifth lens elements 18 and 20 is reduced with a view to compensating for the field curvature occurring in a positive direction on account of the near-distance variation, a positive spherical aberration is also produced in order to compensate for the negative spherical aberration that develops as a result of the near-distance variation. To state this mechanism more specifically, if the aerial distance $d_8$ between the fourth and fifth lens elements 18 and 20 is reduced when the composite power of the first to fourth lens elements 12–18 assumes a positive value, the height at which incident rays encounter the negative fifth lens element 20 is increased to produce a positive spherical aberration. Condition (6) specifies the range of the composite power of the first to fourth lens element 12–18 over which a balanced compensation can be achieved for the field curvature and spherical aberration that occurs as a result of the near-distance variation. If $f_{1-4}$ is unduly small and the lower limit of condition (6) is not reached, overcompensation of the spherical aberration due to the near-distance variation results. If, on the other hand, $f_{1-4}$ is unduly large and the upper limit of condition (6) is exceeded, the spherical aberration due to the near-distance variation is undercompensated.

Five examples of the wide-angle lens system of the present invention are hereunder described with reference to data contained in Tables 1 through 5. In these tables, a j-th lens has a radius of curvature $r_{2j-1}$ for a surface facing the object O, a radius of curvature $r_{2j}$ for a surface facing the image I, a central aerial thickness of $d_{2j-1}$, an aerial separation to a (j+1)-th lens of $d_{2j}$, a refractive index at the d-line of $n_{2j-1}$ and an Abbe number of $\nu_{2j-1}$.

EXAMPLE 1

Aperture ratio, 1:2.8; focal length, f=100, $f_1 = -150.8$, $f_{1-4} = 119.6$; half viewing angle, $\omega = 30.2°$

| i | $r_i$ | $d_i$ | $n_i$ | $\nu_i$ |
|---|---|---|---|---|
| 1 | 75.694 | 4.19 | 1.62041 | 60.3 |
| 2 | 40.957 | 25.41 | | |
| 3 | −78.203 | 4.97 | 1.80518 | 25.4 |
| 4 | −174.219 | 2.26 | | |
| 5 | −202.514 | 12.95 | 1.77250 | 49.7 |
| 6 | −84.758 | 0.39 | | |
| 7 | 63.494 | 11.77 | 1.80610 | 40.9 |
| 8 | 282.740 | 29.05 | | |
| 9 | −182.342 | 5.23 | 1.80518 | 25.4 |
| 10 | 68.630 | 2.54 | | |
| 11 | 434.174 | 6.40 | 1.77250 | 49.7 |
| 12 | −62.338 | 0.36 | | |
| 13 | 49.062 | 7.19 | 1.71736 | 29.5 |
| 14 | 55.980 | | | |

$d_8$ for an image magnification of 1/20: 28.85

EXAMPLE 2

Aperture ratio, 1:2.8; focal length, f=100, $f_1 = -134.0$, $f_{1-4} = 94.5$; half viewing angle, $\omega = 30.2°$

| i | $r_i$ | $d_i$ | $n_i$ | $\nu_i$ |
|---|---|---|---|---|
| 1 | 87.887 | 4.19 | 1.62041 | 60.3 |
| 2 | 41.957 | 26.20 | | |
| 3 | −73.736 | 4.97 | 1.80518 | 25.4 |
| 4 | −125.579 | 8.96 | | |
| 5 | −1075.784 | 12.95 | 1.69350 | 53.2 |
| 6 | −91.267 | 3.58 | | |
| 7 | 64.206 | 11.12 | 1.80610 | 40.9 |
| 8 | 203.026 | 25.44 | | |
| 9 | ∞ | 3.01 | 1.80518 | 25.4 |
| 10 | 57.150 | 3.71 | | |
| 11 | 5869.878 | 8.81 | 1.63854 | 55.4 |
| 12 | −61.501 | 0.26 | | |
| 13 | 51.338 | 7.19 | 1.71300 | 53.8 |
| 14 | 57.606 | | | |

$d_8$ for an image magnification of 1/20: 25.24

EXAMPLE 3

Aperture ratio, 1:2.8; focal length, f=100, $f_1 = -127.5$, $f_{1-4} = 102.4$; half viewing angle, $\omega = 30.2°$

| i | $r_i$ | $d_i$ | $n_i$ | $\nu_i$ |
|---|---|---|---|---|
| 1 | 90.658 | 4.19 | 1.71300 | 53.8 |
| 2 | 44.519 | 27.78 | | |
| 3 | −72.643 | 4.97 | 1.80518 | 25.4 |
| 4 | −164.786 | 2.12 | | |
| 5 | −807.720 | 12.91 | 1.77250 | 49.7 |
| 6 | −88.032 | 8.62 | | |
| 7 | 62.425 | 11.77 | 1.74950 | 35.3 |
| 8 | 277.121 | 26.90 | | |
| 9 | −207.277 | 5.23 | 1.80518 | 25.4 |
| 10 | 64.733 | 3.06 | | |
| 11 | 941.650 | 6.38 | 1.77250 | 49.7 |
| 12 | −64.264 | 0.34 | | |
| 13 | 51.815 | 7.19 | 1.65844 | 50.9 |
| 14 | 62.775 | | | |

$d_8$ for an image magnification of 1/20: 26.65

EXAMPLE 4

Aperture ratio, 1:2.8; focal length, f=100, $f_1 = -138.1$, $f_{1-4} = 105.7$; half viewing angle, $\omega = 30.2°$

| i | $r_i$ | $d_i$ | $n_i$ | $\nu_i$ |
|---|---|---|---|---|
| 1 | 76.934 | 4.19 | 1.71300 | 53.8 |
| 2 | 42.214 | 35.35 | | |
| 3 | −74.792 | 4.97 | 1.80518 | 25.4 |
| 4 | −307.031 | 1.31 | | |
| 5 | −2728.818 | 12.63 | 1.77250 | 49.7 |
| 6 | −83.032 | 0.39 | | |
| 7 | 62.031 | 11.77 | 1.69895 | 30.1 |
| 8 | 362.773 | 24.47 | | |
| 9 | −259.213 | 9.16 | 1.80518 | 25.4 |
| 10 | 60.923 | 3.06 | | |
| 11 | 216.224 | 6.80 | 1.77250 | 49.7 |
| 12 | −73.142 | 0.26 | | |
| 13 | 44.173 | 7.19 | 1.67790 | 55.3 |
| 14 | 46.649 | | | |

$d_8$ for an image magnification of 1/20: 24.27

EXAMPLE 5

Aperture ratio, 1:2.8; focal length, f=100, $f_1 = -129.0$, $f_{1-4} = 84.4$; half viewing angle, $\omega = 30.2°$

| i | $r_i$ | $d_i$ | $n_i$ | $\nu_i$ |
|---|---|---|---|---|
| 1 | 111.152 | 4.18 | 1.61272 | 58.8 |
| 2 | 45.533 | 25.41 | | |
| 3 | −95.394 | 4.97 | 1.80518 | 25.4 |
| 4 | −163.328 | 15.89 | | |
| 5 | 268.072 | 12.42 | 1.69680 | 55.5 |
| 6 | −128.331 | 0.39 | | |
| 7 | 62.418 | 7.19 | 1.80610 | 40.9 |
| 8 | 155.796 | 23.11 | | |
| 9 | ∞ | 11.83 | 1.78470 | 26.2 |
| 10 | 53.484 | 4.12 | | |
| 11 | −595.751 | 7.39 | 1.62041 | 60.3 |
| 12 | −61.246 | 0.52 | | |
| 13 | 57.537 | 7.61 | 1.69680 | 55.5 |
| 14 | 73.461 | | | |

$d_8$ for an image magnification of 1/20: 22.96

As described in the foregoing pages, the present invention provides a wide-angle lens system of the seven-unit-seven-element configuration that satisfies conditions (1) to (5) to achieve effective compensation for various aberrations in a manner satisfactory for use with a camera that features an intermediate film size. The advantages attained by this lens system are obvious from FIGS. 2A, 4A, 6A, 8A and 10A which are graphs plotting the aberration curves obtained from the systems of Examples 1 to 5, respectively, for an infinitely distant object. Each of these figures contains four graphs. The first graph plots spherical aberration (SA) and sine condition (SC) as a function of aperture. The second graph plots chromatic aberration as a function of aperture for the d-line, g-line and C-line. The third graph plots astigmatism as a function of half viewing angle ω in the sagittal (ΔS) and meridional (ΔM) direction. The fourth graph plots distortion as a function of half viewing angle. The fifth graph plots transverse chromatic aberration as a function of half viewing angle ω for the g-line and the C-line.

In particular, as shown by these curves, the system of the present invention achieves marked improvements in compensation for astigmatism and lateral chromatic aberration as compared with the systems proposed in Japanese Patent Publication Nos. 60606/1982 and 1588/1970.

Figure 2A:
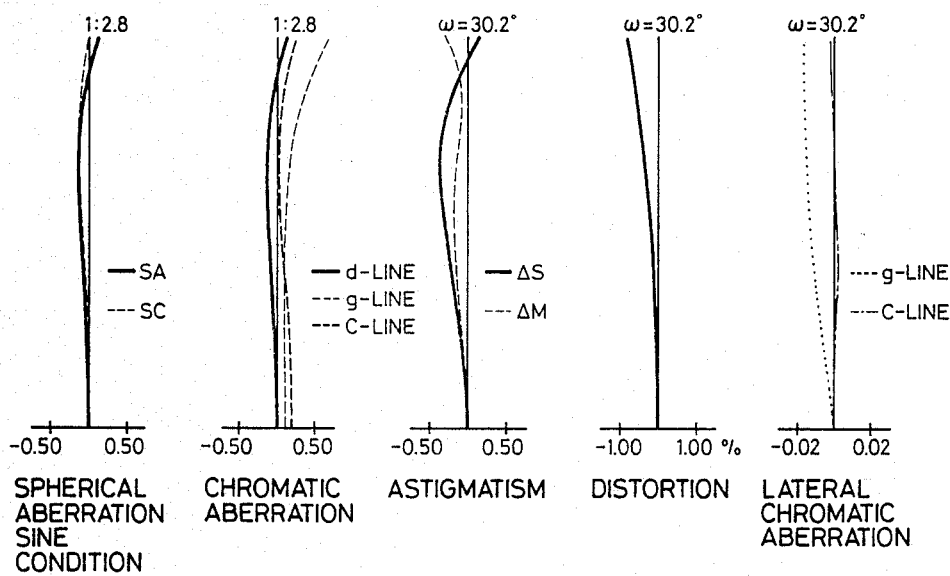
FIGS. 2A-2C, 4A-4C, 6A-6C, 8A-8C and 10A-10C are graphs plotting the aberration curves obtained from the lens systems of Examples 1 to 5, respectively.
Figure 2B:
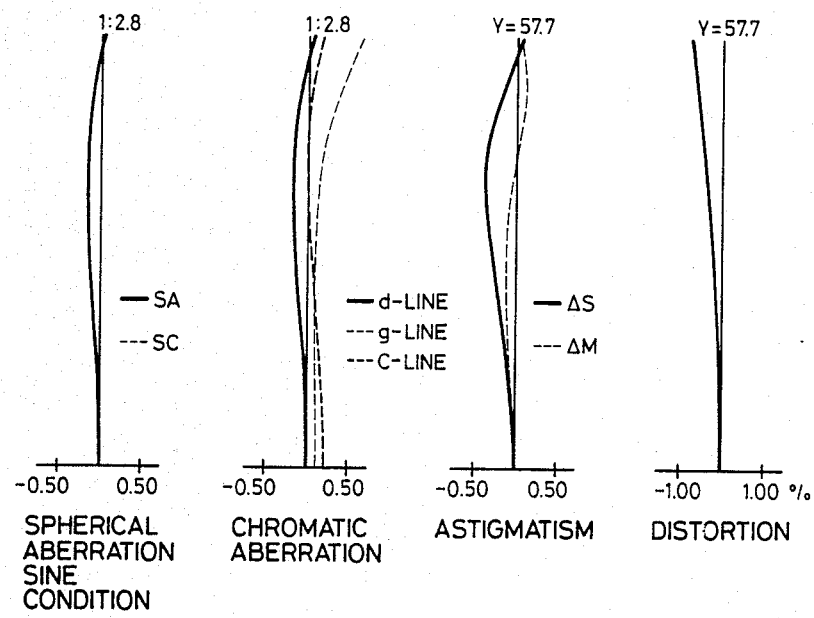
Figure 2C:
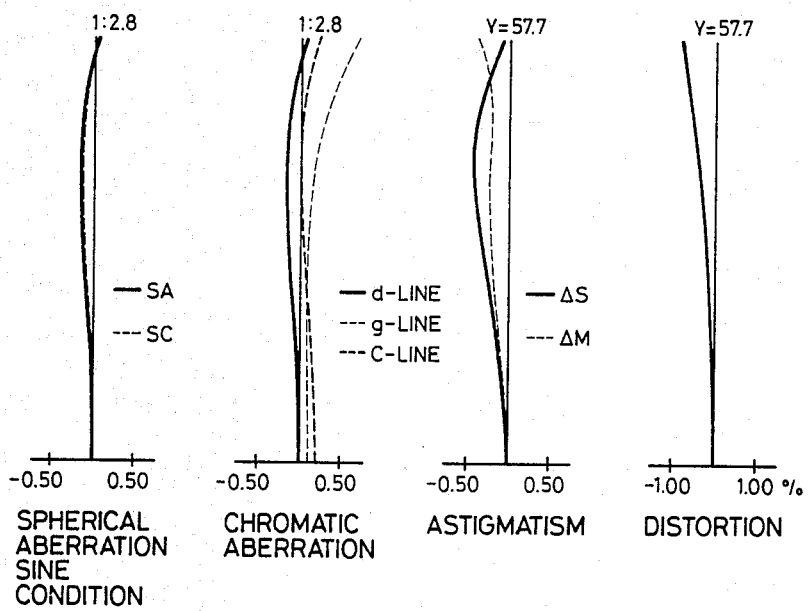
Figure 3:
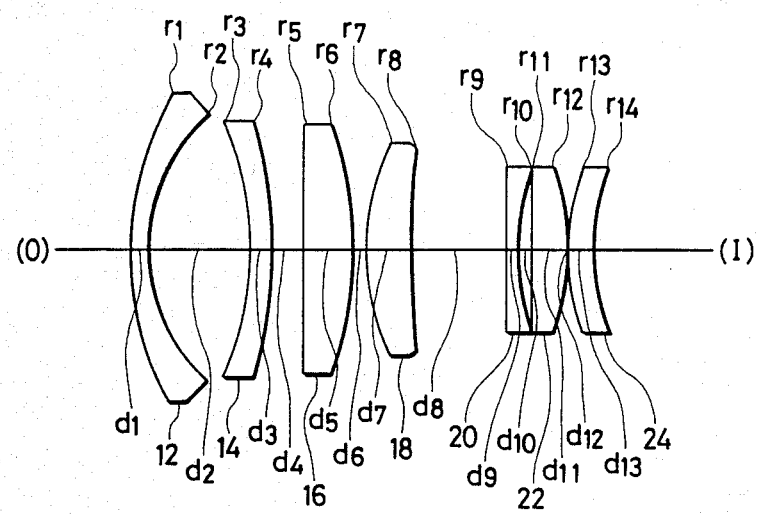
Figure 4A:
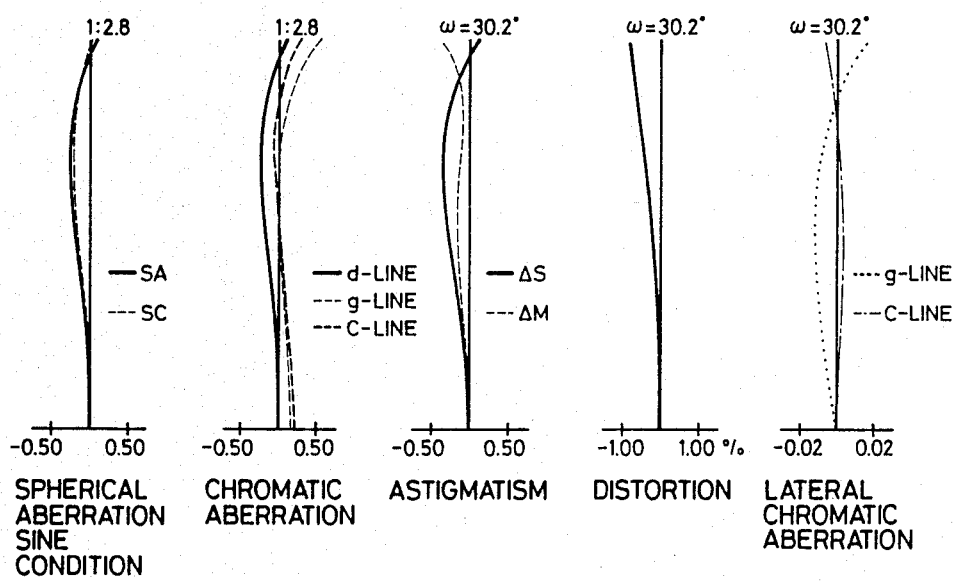
Figure 4B:
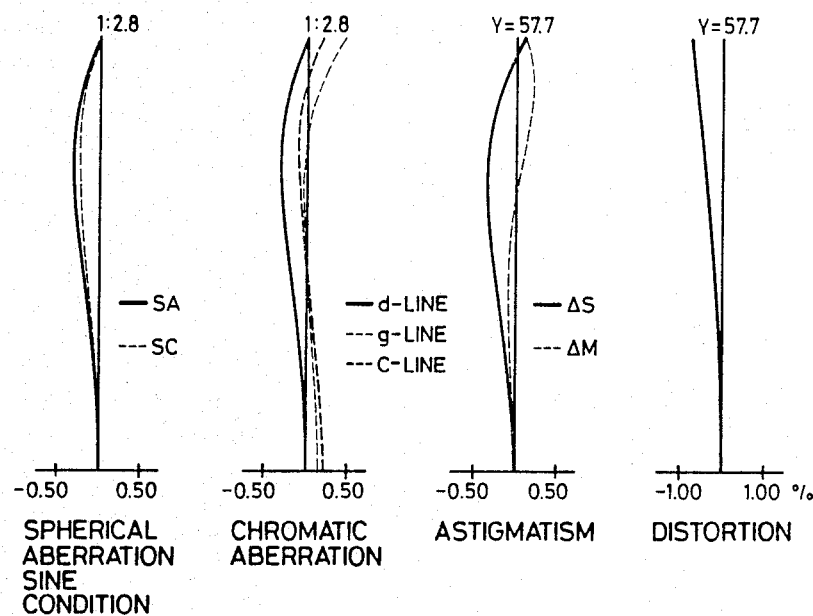
Figure 4C:
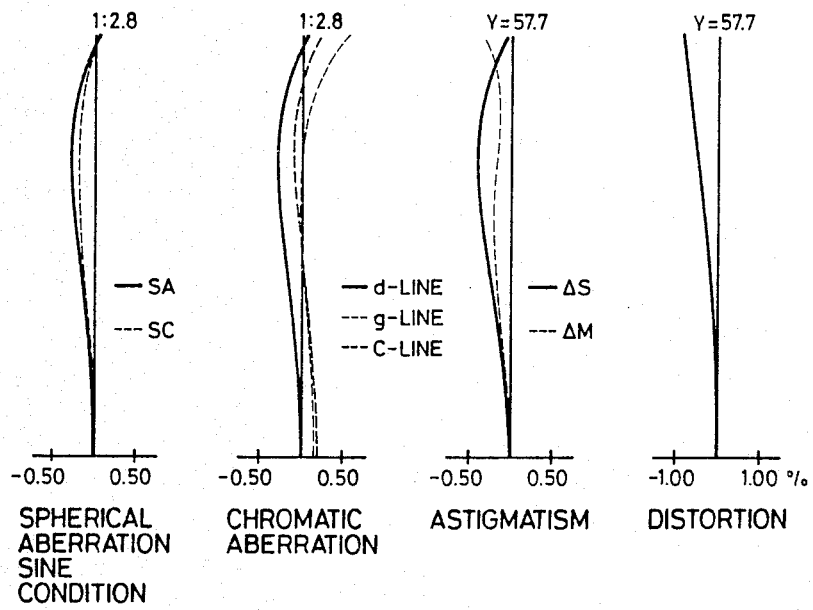
Figure 5:
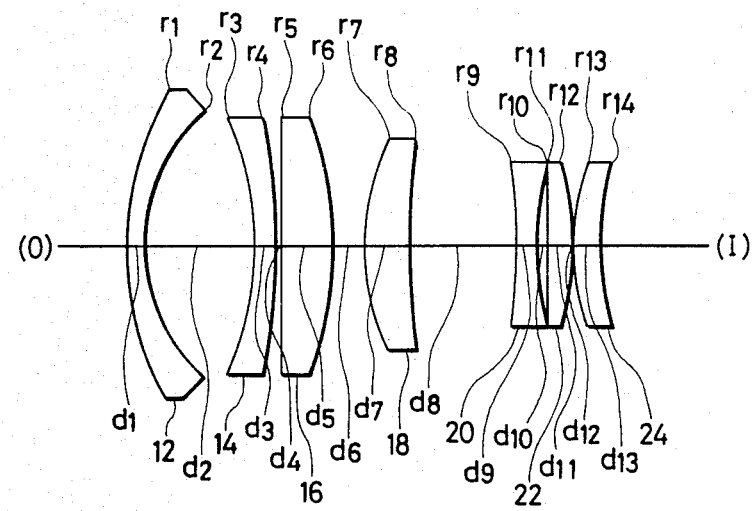
Figure 6A:
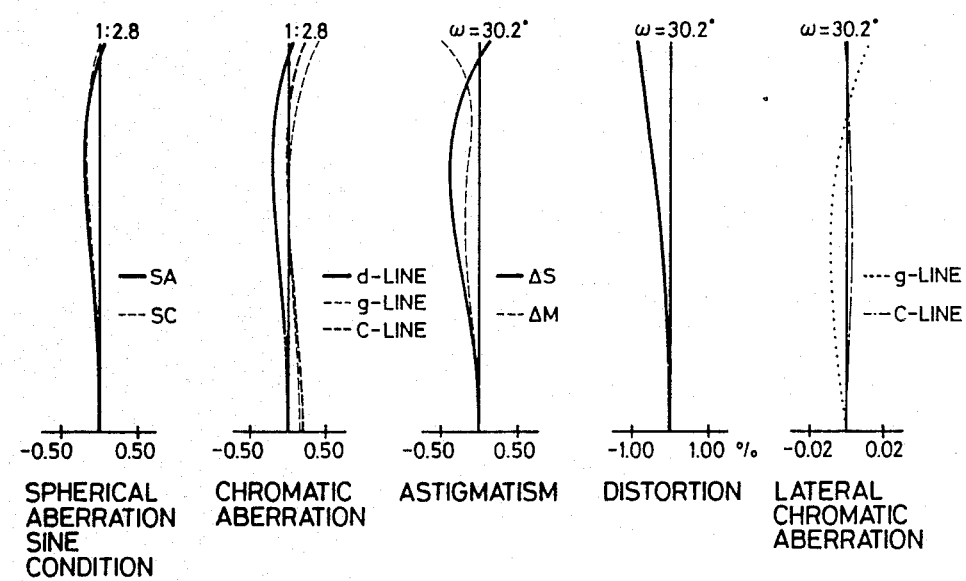
Figure 6B:
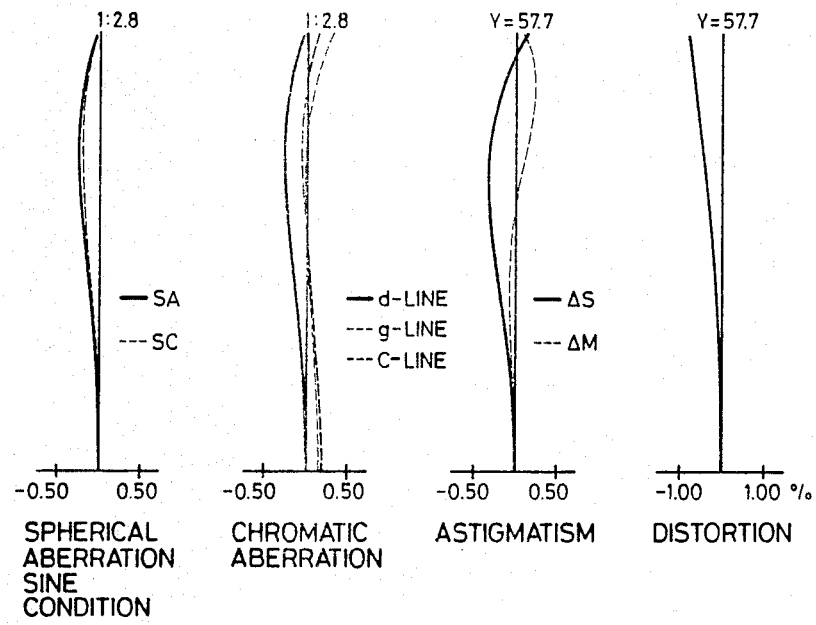
Figure 6C:
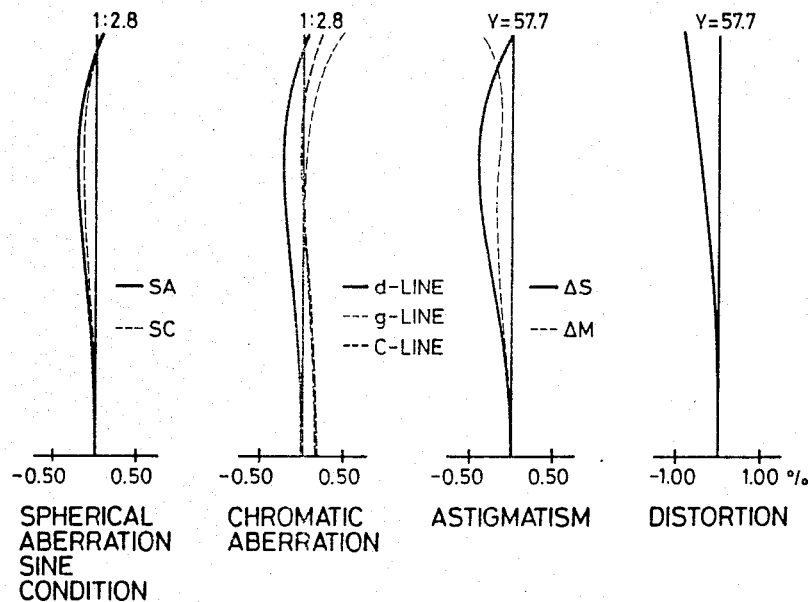
Figure 7:
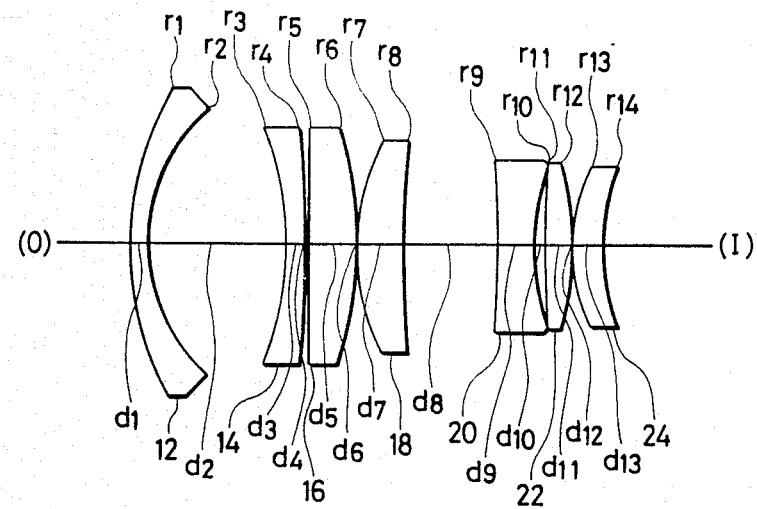
Figure 8A:
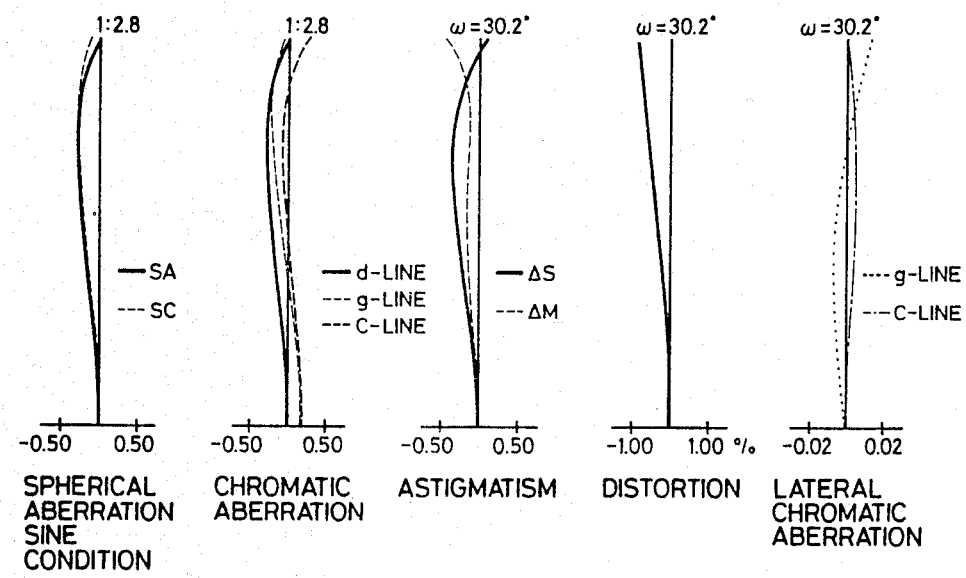
Figure 8B:
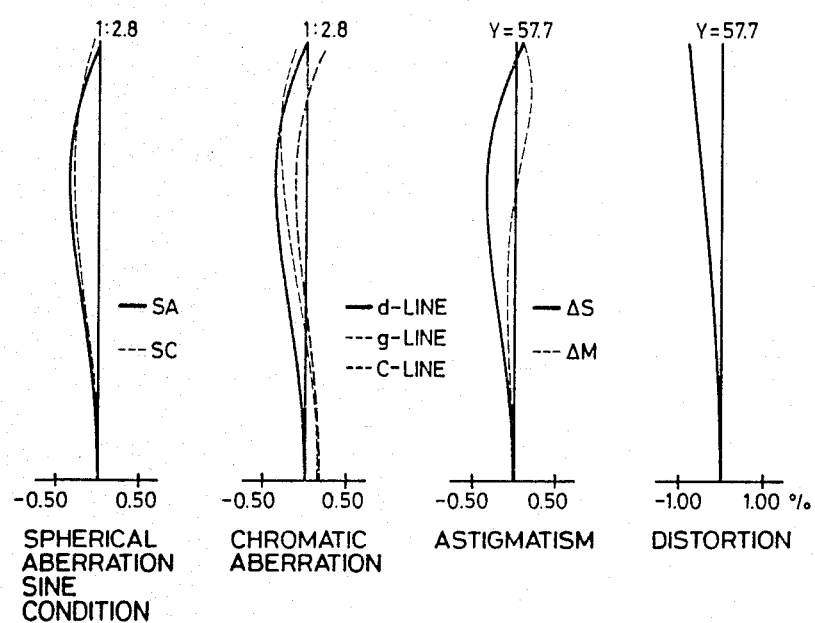
Figure 8C:
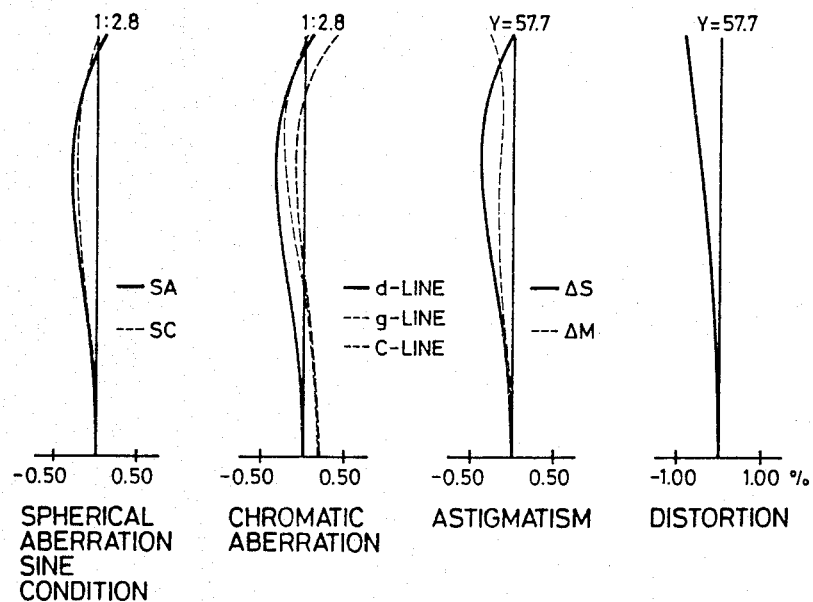
Figure 9:
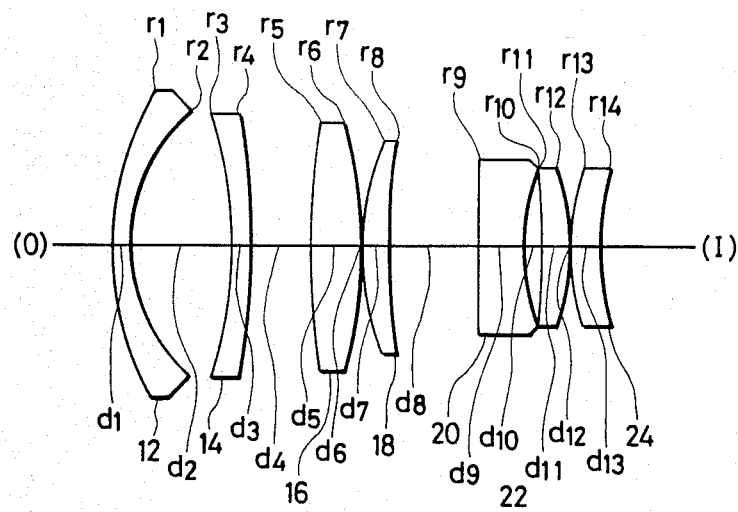
Figure 10A:
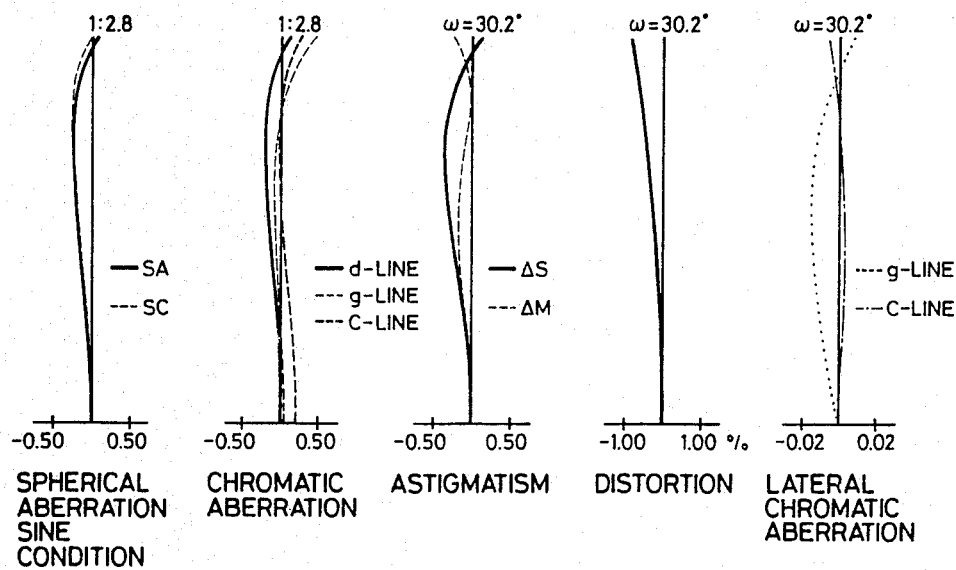
Figure 10B:
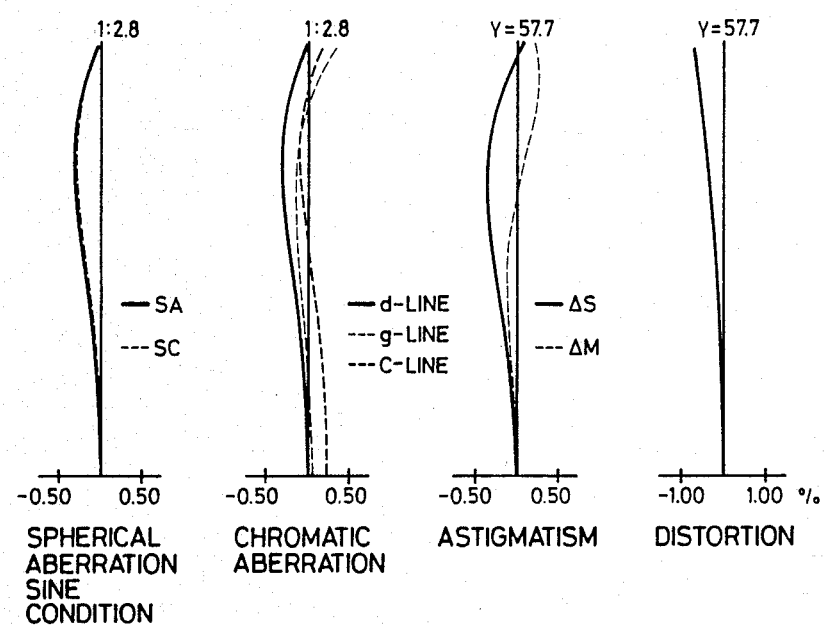
Figure 10C:
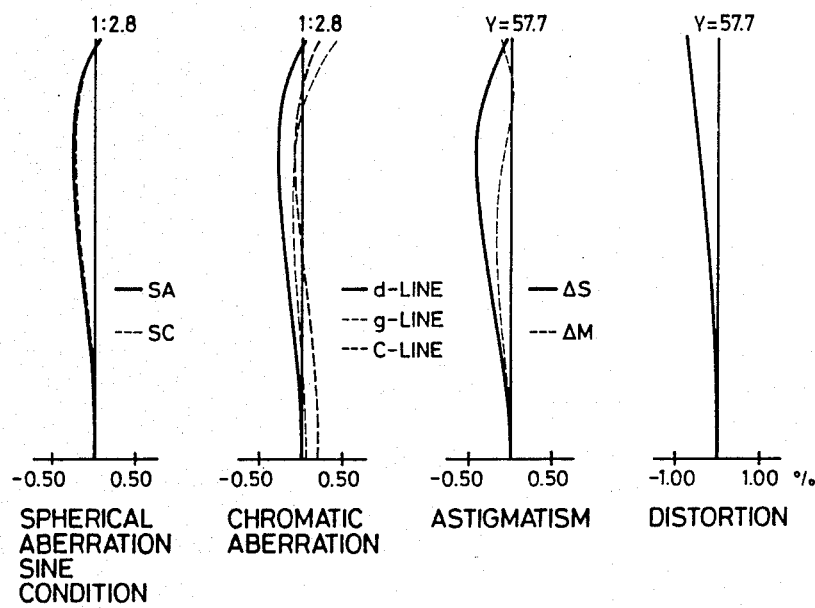

In addition, FIGS. 2B, 4B, 6B, 8B and 10B contain aberrational curves similar to those of FIG. 2A etc. except the third and fourth graphs are plotted as a function of image height and there is no fifth graph. These aberrational curves are for the case where an image magnification of 1/20 is attained in the absence of any compensation for near-distance variation. The aberrational curves of FIGS. 2C, 4C, 6C, 8C and 10C have the same format as FIG. 2B etc. and are for the case where an image magnification is attained when compensation for the near-distance variation is effected by reducing the aerial distance $d_8$ between the fourth and fifth lens elements 18 and 20 to the values listed at the bottom of the respective tables. Comparison of FIG. 2B etc. will make it clear that a balanced compensation for the aberrations due to the near-distance variation can be achieved by reducing the aerial distance between the fourth and fifth lens elements 18 and 20 when the object is at a close distance.

I claim:

1. A wide-angle lens system of the seven-unit-seven-element configuration which comprises, in order from the object side, a first lens element which is a negative meniscus lens having a convex surface directed toward an object, a second lens element which is a negative meniscus lens having a convex surface directed toward an image, a third lens element which is a positive lens having a convex surface directed toward the image, a fourth lens element which is a positive lens having a convex surface directed toward the object, a fifth lens element which is a negative lens, a sixth lens element which has a convex surface directed toward the image, and a seventh lens element which is a meniscus lens having a convex surface directed toward the object, said lens system satisfying the following conditions:

(1) $-1.6 < f_1/f < -1.2$
(2) $-1.1 < r_3/f < -0.65$
(3) $\nu_1 > 40$
(4) $\nu_2 > 40$
(5) $n_3, n_4 > 1.65$ where f is the focal length of the overall lens system; $f_1$ is the focal length of the first lens element; $r_3$ is a radius of curvature of a surface of the second lens element which is the side of the object; $\nu_1$ and $\nu_2$ denote Abbe numbers of the first and second lens elements, respectively; and $n_3$ and $n_4$ denote refractive indices, of the third and fourth lens elements, respectively.

2. A wide-angle lens system according to claim 1, wherein an aerial distance between the fourth and fifth lens elements is reduced as the object is brought to a closer distance.

3. A wide-angle lens system according to claim 1, which further satisfies the following condition:

(6) $0.75 < f_{1\text{-}4}/f < 1.25$ where $f_{1\text{-}4}$ is a composite focal length of the first to fourth lens elements.

4. A wide-angle lens system according to claim 2 which further satisfies the following condition:

(6) $0.75 < f_{1\text{-}4}/f < 1.25$ where $f_{1\text{-}4}$ is the composite focal length of the first to fourth lens elements.

5. A wide-angle lens system as recited in claim 3, wherein said lens constituting a j-th one of said lens elements has a radius of curvature $r_{2j-1}$ for a surface facing the object, a radius of curvature $r_{2j}$ for a surface facing the image, a central aerial thickness of $d_{2j-1}$, an aerial separation $d_{2j}$ to said lens constituting a (j+1)-th one of said lens elements, a refractive index $n_{2j-1}$ at a d-line and an Abbe number $\nu_{2j-1}$, wherein said lenses satisfy the follow table:

| i | $r_i$ | $d_i$ | $n_i$ | $\nu_i$ |
|---|---|---|---|---|
| 1 | 75.694 | 4.19 | 1.62041 | 60.3 |
| 2 | 40.957 | 25.41 | | |
| 3 | −78.203 | 4.97 | 1.80518 | 25.4 |
| 4 | −174.219 | 2.26 | | |
| 5 | −202.514 | 12.95 | 1.77250 | 49.7 |
| 6 | −84.758 | 0.39 | | |
| 7 | 63.494 | 11.77 | 1.80610 | 40.9 |
| 8 | 282.740 | 29.05 | | |
| 9 | −182.342 | 5.23 | 1.80518 | 25.4 |
| 10 | 68.630 | 2.54 | | |
| 11 | 434.174 | 6.40 | 1.77250 | 49.7 |
| 12 | −62.338 | 0.36 | | |
| 13 | 49.062 | 7.19 | 1.71736 | 29.5 |
| 14 | 55.980 | | | |

6. A wide-angle lens system as recited in claim 3, wherein said lens constituting a j-th one of said lens elements has a radius of curvature $r_{2j-1}$ for a surface facing the object, a radius of curvature $r_{2j}$ for a surface facing the image, a central aerial thickness of $d_{2j-1}$, an aerial separation $d_{2j}$ to said lens constituting a (j+1)-th one of said lens elements, a refractive index $n_{2j-1}$ at a d-line and an Abbe number $\nu_{2j-1}$, wherein said lenses satisfy the follow table:

| i | $r_i$ | $d_i$ | $n_i$ | $\nu_i$ |
|---|---|---|---|---|
| 1 | 87.887 | 4.19 | 1.62041 | 60.3 |
| 2 | 41.957 | 26.20 | | |
| 3 | −73.736 | 4.97 | 1.80518 | 25.4 |
| 4 | −125.579 | 8.96 | | |
| 5 | −1075.784 | 12.95 | 1.69350 | 53.2 |
| 6 | −91.267 | 3.58 | | |
| 7 | 64.206 | 11.12 | 1.80610 | 40.9 |
| 8 | 203.026 | 25.44 | | |
| 9 | ∞ | 3.01 | 1.80518 | 25.4 |
| 10 | 57.150 | 3.71 | | |
| 11 | 5869.878 | 8.81 | 1.63854 | 55.4 |
| 12 | −61.501 | 0.26 | | |
| 13 | 51.338 | 7.19 | 1.71300 | 53.8 |
| 14 | 57.606 | | | |

7. A wide-angle lens system as recited in claim 3, wherein said lens constituting a j-th one of said lens elements has a radius of curvature $r_{2j-1}$ for a surface facing the object, a radius of curvature $r_{2j}$ for a surface facing the image, a central aerial thickness of $d_{2j-1}$, an aerial separation $d_{2j}$ to said lens constituting a (j+1)-th one of said lens elements, a refractive index $n_{2j-1}$ at a d-line and an Abbe number $\nu_{2j-1}$, wherein said lenses satisfy the follow table:

| i | $r_i$ | $d_i$ | $n_i$ | $\nu_i$ |
|---|---|---|---|---|
| 1 | 90.658 | 4.19 | 1.71300 | 53.8 |
| 2 | 44.519 | 27.78 | | |
| 3 | −72.643 | 4.97 | 1.80518 | 25.4 |
| 4 | −164.786 | 2.12 | | |
| 5 | −807.720 | 12.91 | 1.77250 | 49.7 |
| 6 | −88.032 | 8.62 | | |
| 7 | 62.425 | 11.77 | 1.74950 | 35.3 |
| 8 | 277.121 | 26.90 | | |
| 9 | −207.277 | 5.23 | 1.80518 | 25.4 |
| 10 | 64.733 | 3.06 | | |
| 11 | 941.650 | 6.38 | 1.77250 | 49.7 |
| 12 | −64.264 | 0.34 | | |
| 13 | 51.815 | 7.19 | 1.65844 | 50.9 |
| 14 | 62.775 | | | |

8. A wide-angle lens system as recited in claim 3, wherein said lens constituting a j-th one of said lens elements has a radius of curvature $r_{2j-1}$ for a surface facing the object, a radius of curvature $r_{2j}$ for a surface facing the image, a central aerial thickness of $d_{2j-1}$, an aerial separation $d_{2j}$ to said lens constituting a (J+1)-th one of said lens elements, a refractive index $n_{2j-1}$ at a d-line and an Abbe number $\nu_{2j-1}$, wherein said lenses satisfy the follow table:

| i | $r_i$ | $d_i$ | $n_i$ | $\nu_i$ |
|---|---|---|---|---|
| 1 | 76.934 | 4.19 | 1.71300 | 53.8 |
| 2 | 42.214 | 35.35 | | |
| 3 | −74.792 | 4.97 | 1.80518 | 25.4 |
| 4 | −307.031 | 1.31 | | |
| 5 | −2728.818 | 12.63 | 1.77250 | 49.7 |

-continued

| i | $r_i$ | $d_i$ | $n_i$ | $\nu_i$ |
|---|---|---|---|---|
| 6 | −83.032 | 0.39 | | |
| 7 | 62.031 | 11.77 | 1.69895 | 30.1 |
| 8 | 362.773 | 24.47 | | |
| 9 | −259.213 | 9.16 | 1.80518 | 25.4 |
| 10 | 60.923 | 3.06 | | |
| 11 | 216.224 | 6.80 | 1.77250 | 49.7 |
| 12 | −73.142 | 0.26 | | |
| 13 | 44.173 | 7.19 | 1.67790 | 55.3 |
| 14 | 46.649 | | | |

9. A wide-angle lens system as recited in claim 3, wherein said lens constituting a j-th one of said lens elements has a radius of curvature $r_{2j-1}$ for a surface facing the object, a radius of curvature $r_{2j}$ for a surface facing the image, a central aerial thickness of $d_{2j-1}$, an aerial separation $d_{2j}$ to said lens constituting a (j+1)-th one of said lens elements, a refractive index $n_{2j-1}$ at a d-line and an Abbe number $\nu_{2j-1}$, wherein said lenses satisfy the follow table:

| i | $r_i$ | $d_i$ | $n_i$ | $\nu_i$ |
|---|---|---|---|---|
| 1 | 111.152 | 4.18 | 1.61272 | 58.8 |
| 2 | 45.533 | 25.41 | | |
| 3 | −95.394 | 4.97 | 1.80518 | 25.4 |
| 4 | −163.328 | 15.89 | | |
| 5 | 268.072 | 12.42 | 1.69680 | 55.5 |
| 6 | −128.331 | 0.39 | | |
| 7 | 62.418 | 7.19 | 1.80610 | 40.9 |
| 8 | 155.796 | 23.11 | | |
| 9 | ∞ | 11.83 | 1.78470 | 26.2 |
| 10 | 53.484 | 4.12 | | |
| 11 | −595.751 | 7.39 | 1.62041 | 60.3 |
| 12 | −61.246 | 0.52 | | |
| 13 | 57.537 | 7.61 | 1.69680 | 55.5 |
| 14 | 73.461 | | | |

* * * * *